UNITED STATES PATENT OFFICE.

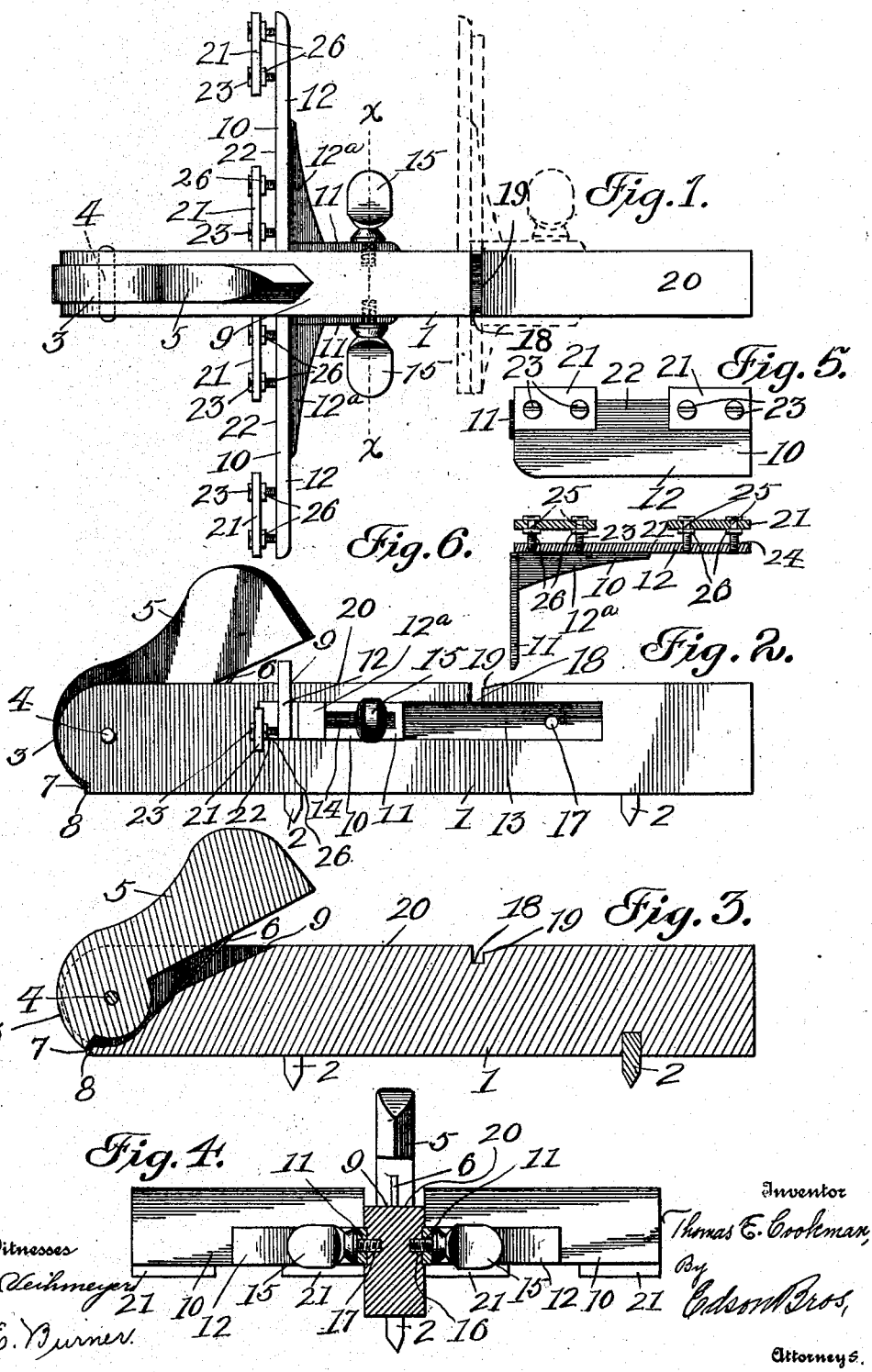

THOMAS E. COOKMAN, OF EVERSON, WASHINGTON.

SAW-TOOL.

No. 900,666.　　　　　Specification of Letters Patent.　　　　Patented Oct. 6, 1908.

Application filed September 16, 1907. Serial No. 393,106.

*To all whom it may concern:*

Be it known that I, THOMAS E. COOKMAN, a citizen of the United States, residing at Everson, in the county of Whatcom and State of Washington, have invented certain new and useful Improvements in Saw-Tools; and I do hereby declare the following to be a full, clear, and exact description of the invention, such as will enable others skilled in the art to which it appertains to make and use the same.

My invention relates to improvements in saw tools and has for its object to provide a simple, cheap and convenient combination saw-set, jointer and raker-gage.

The invention consists in further features of construction as will be hereinafter more fully described and specified.

In the accompanying drawings, illustrating the preferred embodiment of the invention: Figure 1 is a plan view of a device constructed in accordance with my invention. Fig. 2 is a side elevation thereof. Fig. 3 is a broken longitudinal sectional view. Fig. 4 is a cross section taken on line $x$—$x$ of Fig. 1. Fig. 5 is a detail view of the raker-gage, and Fig. 6 is a sectional view thereof.

Referring more particularly to the drawings, 1 represents a rectangular block forming the base or main portion of the device having pointed projections 2 on its bottom surface which may be driven into a log or block of wood to hold the device in position. The base has a bifurcated or recessed end portion 3 between the arms of which is mounted on a cross pin 4 the die 5 normally held in a raised position by means of the spring 6. The die has an extended portion 7 on its pivoted end adapted to abut against the end surface 8 of the base thus forming a stop to limit its upward movement. The inner end of said bifurcated or recessed portion is inclined or beveled forming an anvil 9 for the purpose of giving the desired set to the saw by means of the die 5.

The saw to be set rests upon the top surface of the base 1 and its position relative to the anvil and die or its forward movement is limited or regulated by means of guides 10 adjustably connected to opposite sides of the base 1. Said guides 10 consist of shank pieces 11 arranged at right angles to plates 12 which project a sufficient distance above the shanks to engage the saw teeth. Said shanks are attached to braces 12ª which are secured to the plates 12. The lower edges of the plates 12, the shanks 11 and braces 12ª are arranged in the same plane, perpendicular to the faces of the plates 12. The shank pieces 11 are adapted to slide in grooves 13 in the sides of the base and are slotted, as shown at 14, to receive set screws 15 which engage screw threaded openings or sockets 16 and 17, in the grooves 13. By this means the guides may be adjusted and clamped in position.

The base has an opening 18 in its upper surface to receive a flat file. When the device is to be used as a jointer, the set screws 15 are removed and the guides moved back in the grooves 13 until the plates 12 come in contact with the side of the flat file and securely clamp it, the set screws being screwed in the openings 17. The outer edge of the opening 18 is beveled, as at 19, to allow clearance for the set of the saw. After the file is clamped in position, as above described, and the device removed from the stump or block of wood, it is ready to be used as a jointer. The saw to be operated upon is clamped in a suitable frame and the portion 20 of the upper surface of the base is brought into contact with the side of the saw which insures the file being held perpendicular to the plane of the saw blade.

The raker-gage attachment consists of two gage plates 21, adjustably secured to the outer face 22 of the plate 12 of one of the guides. Each gage plate 21 is secured to the plate 12 by means of two screws 23 which engage screw-threaded sockets 24 in the plate 12 and pass through openings 25 in the gage plates 21. Said screws are provided with beads or annular portions 26 which support the plates 21. After the plates are placed on the screws 23 the heads of the screws are burred over or upset and slots filed therein to allow a screw driver or suitable implement to be applied. To use the raker-gage, the guide must be removed from the base 1 and placed on the saw so that the edges of the plate 12, shank piece 11 and brace 12ª rest against the blade of the saw with the under surface of the gage plates 21 resting on the saw teeth, the plates 21 being regulated to different heights above the face 22 of the plate 12, by means of the screws 23. By this means the raker-gage may be quickly adjusted to give the desired cut to the raker-teeth.

I claim:

1. In a device of the character described, a base having a bifurcated end portion, the inner end of said bifurcated portion being beveled to form an anvil, a die mounted in said bifurcation, and guides adjustably mounted on said base, as and for the purpose specified.

2. In a device of the character described, a base having a bifurcated end portion, the inner end of said bifurcation being beveled to form an anvil, a die pivotally supported in said bifurcation, a spring housed in said bifurcation and adapted to normally hold said die in a raised position, and adjustable guides mounted on said base, substantially as set forth.

3. In a device of the character described, a base having a transverse groove in its upper surface adapted to receive a file, a die mounted on said base, an anvil on said base, and adjustable guides mounted on said base, adapted to be arranged to either regulate the amount of set of a saw or clamp a file in place in said transverse groove.

4. In a device of the character described, a base having a transverse groove in its upper surface adapted to receive a file, one edge of said groove being beveled to allow clearance for the set of a saw, a die mounted on said base, an anvil on said base, longitudinal grooves in opposite sides of the base, guides having slotted shank pieces adapted to slide in said longitudinal grooves, two screw-threaded sockets in each of said longitudinal grooves to receive set screws adapted to pass through the slots in said shank pieces and clamp the guides in position to either regulate the amount of set of a saw or to clamp the file in place in said transverse groove.

In testimony whereof, I affix my signature, in presence of two witnesses.

THOMAS E. COOKMAN.

Witnesses:
C. M. SMITH,
N. V. NORMAN.